July 22, 1924.                                             1,502,205
                         L. R. McGUIRE
                 VULCANIZING PROCESS AND APPARATUS
                    Filed May 27, 1922      5 Sheets-Sheet 1
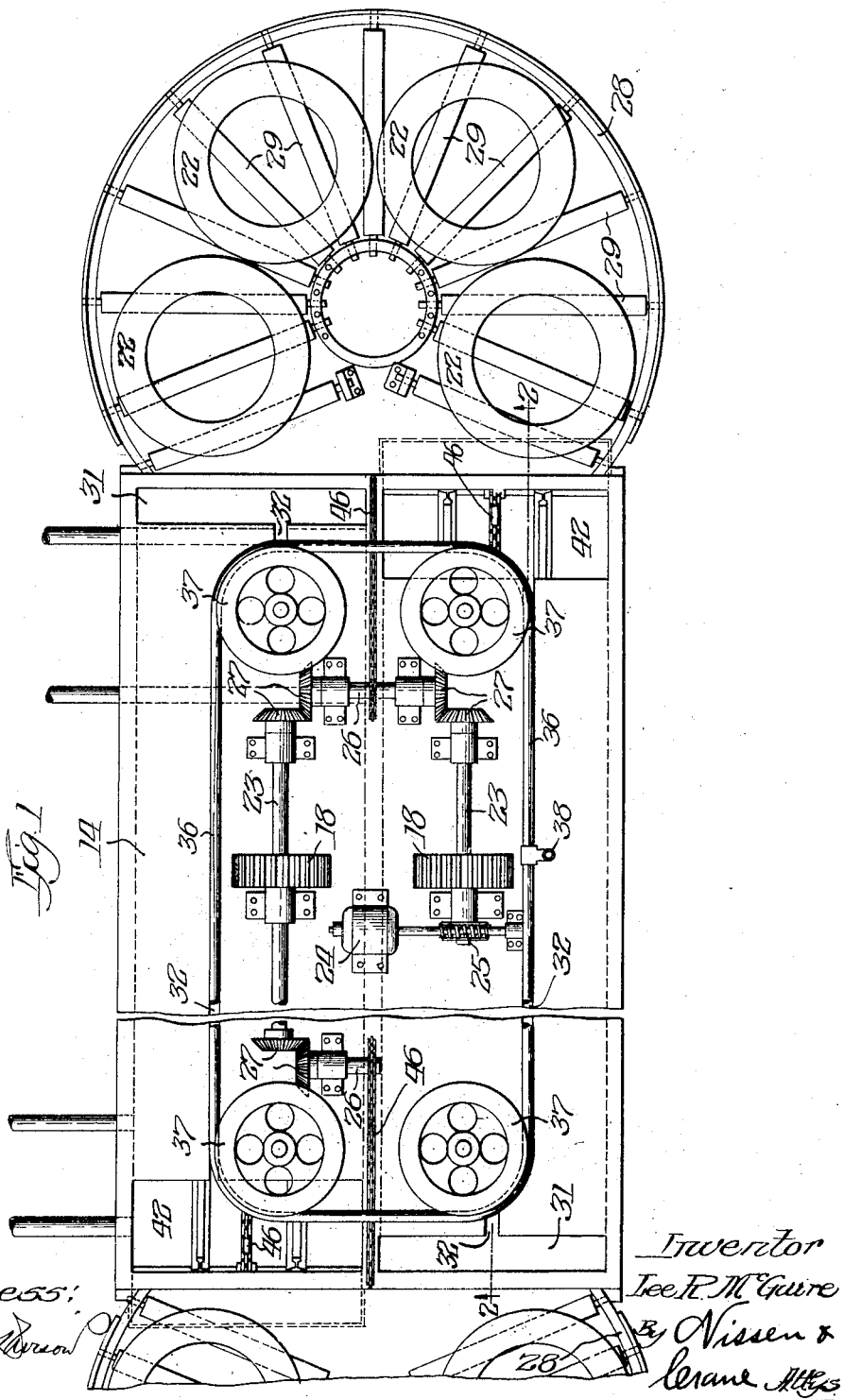

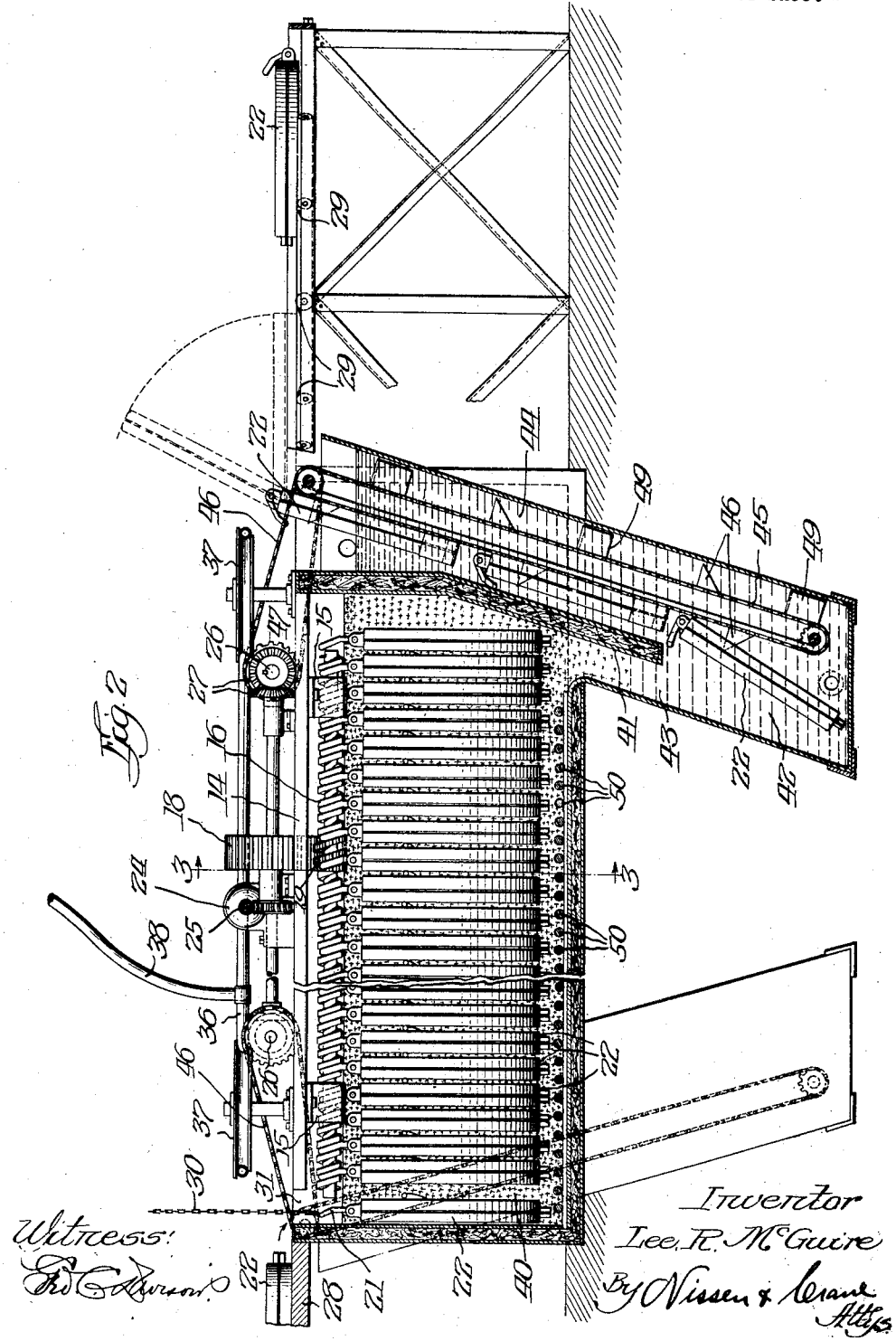

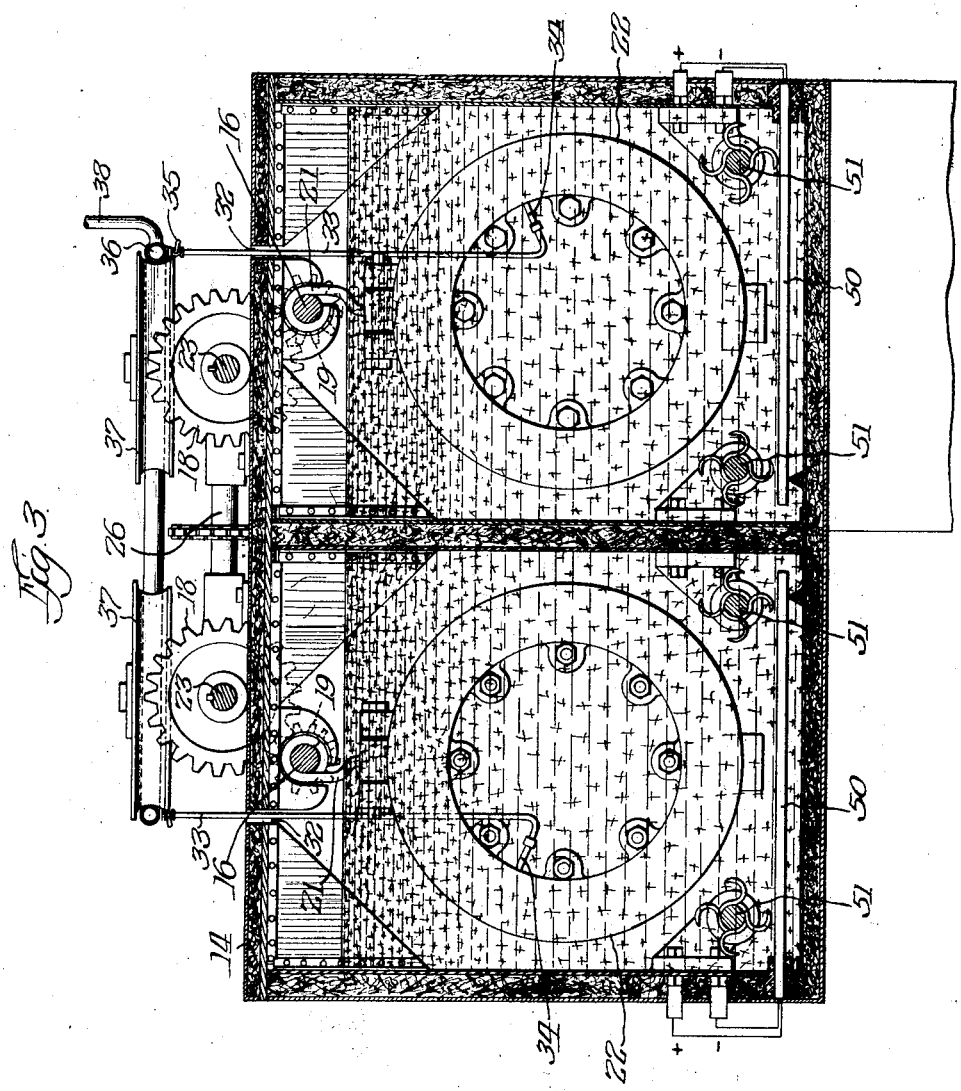

July 22, 1924.
L. R. McGUIRE
VULCANIZING PROCESS AND APPARATUS
Filed May 27, 1922
1,502,205
5 Sheets-Sheet 4
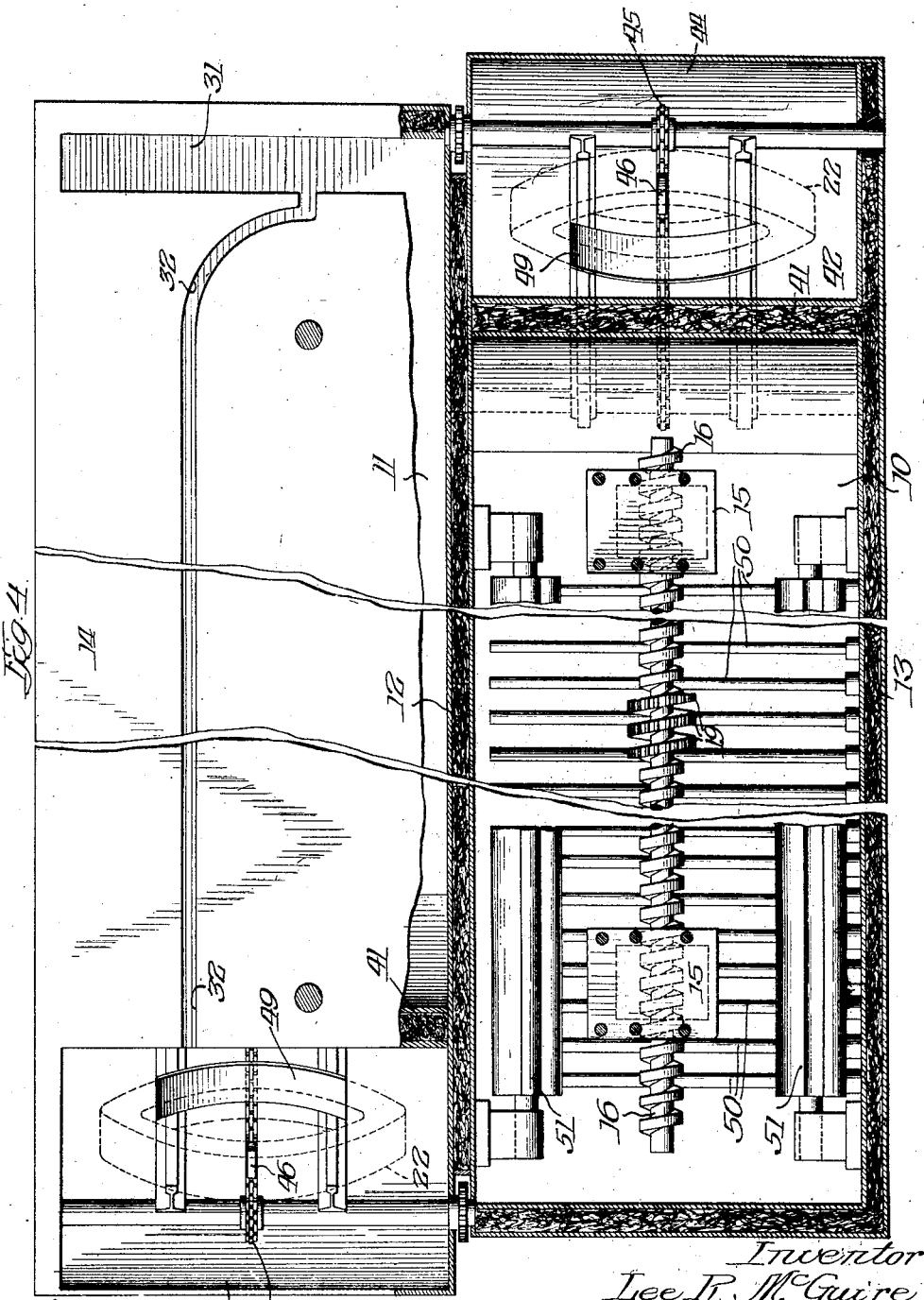

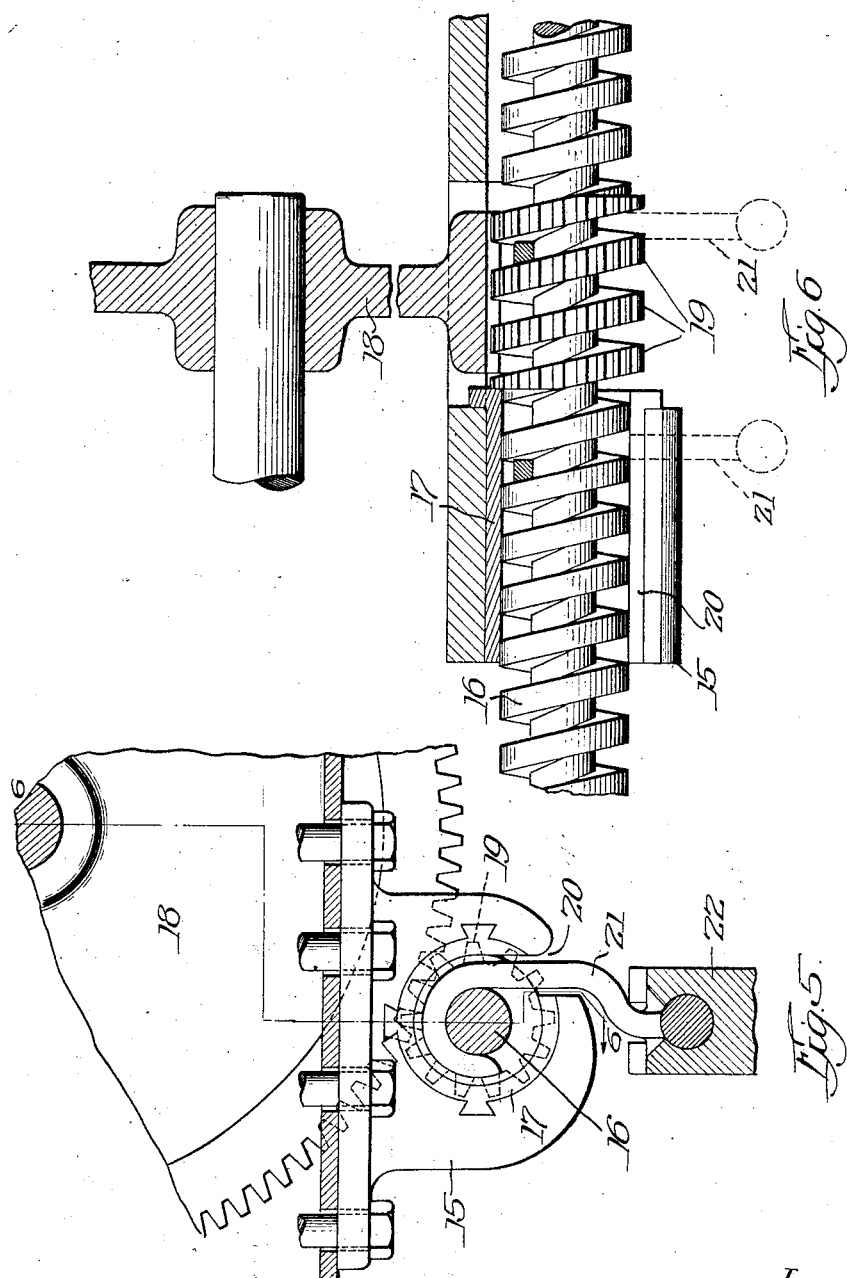

Patented July 22, 1924.

1,502,205

UNITED STATES PATENT OFFICE.

LEE R. McGUIRE, OF CHICAGO, ILLINOIS, ASSIGNOR TO MORGAN & WRIGHT, A CORPORATION OF MICHIGAN.

VULCANIZING PROCESS AND APPARATUS.

Application filed May 27, 1922. Serial No. 564,004.

*To all whom it may concern:*

Be it known that I, LEE R. McGUIRE, a citizen of the United States, residing at Chicago, in the county of Cook and State of Illinois, have invented certain new and useful Improvements in Vulcanizing Processes and Apparatus, of which the following is a specification.

This invention relates to a process and apparatus for vulcanizing rubber goods such as vehicle tires and other articles which are formed from raw material and vulcanized by heat.

The invention has for its object the provision of a vulcanizing process and suitable apparatus for executing the process which shall be economical and efficient in operation and which shall avoid many of the difficulties incident to present methods.

The invention is exemplified in the combination and arrangement of parts shown in the accompanying drawings and described in the following specification and by the steps of the process set forth therein, and it is more particularly pointed out in the appended claims.

In the drawings,—

Fig. 1 is a top plan view of one form of apparatus comprised in the present invention.

Fig. 2 is a vertical section substantially on line 2—2 of Fig. 1.

Fig. 3 is a vertical section substantially on line 3—3 of Fig. 1.

Fig. 4 is a horizontal sectional view with parts in plan, showing the apparatus within the vulcanizing tank.

Fig. 5 is a fragmentary detail showing the driving connection for the mold conveyor.

Fig. 6 is a section on line 6—6 of Fig. 5.

In the vulcanization of articles in large quantities as at present practiced, articles are placed in heavy molds which are assembled in quantities in a steam chamber and subjected to pressure by hydraulic rams or other power apparatus. The molds thus held are surrounded by live steam at the requisite pressure and temperature until the proper vulcanization is secured. The steam is then discharged and the articles removed from the molds. This process requires a waste of a large amount of heat remaining in the steam when discharged from the chambers surrounding the molds and also requires very heavy mold construction to withstand the pressure required to retain the molds in place and properly closed. A large amount of floor space is necessary for the required apparatus, and the process is necessarily periodic and cannot be carried on continuously. All of these objections are practically eliminated by the present invention, one embodiment of which is shown and described herein by way of example.

Referring more particularly to the drawings, the numerals 10 and 11 designate a pair of vulcanizing vats or tanks arranged side by side and separated by a partition wall 12. The tanks are enclosed by walls 13, which may consist of spaced metal plates having the intervening space filled with a non-conductor such as asbestos. Each tank comprises a complete vulcanizing unit within itself and the two units are placed side by side to facilitate continuous operation. Above the tanks 10 and 11 is a suitable cover plate 14, from the lower face of which are suspended bearings 15 for screw conveyors 16. As shown in Figs. 5 and 6, the bearings 15 have suitable bushings 17 within which the threaded conveyors 16 are journaled, the outer periphery of the threads being arranged to rotate within the bushings 17. The conveyors 16 are rotated by spur gears 18, which mesh with teeth 19 formed by the periphery of the conveyor 16 for a portion of its length, as best illustrated in Fig. 6. The enlarged portion of the threads thus provided bears against the end of the bushing 17 and prevents endwise movement of the conveyor. The bearings 15 are cut away as shown at 20, to provide a passage for suspension hooks 21, which carry the vulcanizing molds 22. The gears 18 are mounted on shafts 23, which are driven by a motor 24, as best shown in Fig. 1. The motor 24 is provided with worm gearing 25, which is connected with one of the shafts 23, and cross shafts 26 are provided with bevel gears 27 for connecting the two shafts 23. At each end of the vulcanizing tanks there is arranged a suitable platform 28 for handling the molds as they are fed to and received from the vulcanizing tanks. This may comprise a circular support having rollers 29 as shown in the drawing, or any other suitable form of delivery and receiving platform may be employed. The molds 22, after they have been properly filled and the parts secured together by bolts or clamps, are delivered from the platform 28 at one end of the tank to the screw conveyor 16. In the sectional view shown in Fig. 2 the molds enter the tank from the left hand end and are fed continuously from the left to the right through the tank and are removed from the opposite end thereof. Any suitable means may be used for lifting the molds from the platform 28 and depositing them on the conveyor 16. A chain 30 is shown in the drawing for this purpose, which may be operated by an overhead crane or pneumatic hoist or other suitable lifting apparatus. The chain is connected with the suspension hook 21 and the mold is lowered through the opening 31 at the end of the cover 14. A groove 32 is provided in the cover for accommodating the hooks 21 as the molds are moved by the conveyor 16 through the vulcanizing tank. It will be apparent that the weight of the molds will hold the hooks 21 against rotation and that the rotation of the conveyor will gradually feed the molds to the right as viewed in Fig. 2. In the vulcanization of tires or other hollow objects it is usual to provide an inflated bag to form the core of the mold during the vulcanization. This may be inflated and sealed to maintain the proper opening within the tire, but to provide against accidental displacement it is sometimes found desirable to maintain a constant pressure upon the bag during the vulcanizing process. This may be done by means of tubes 33, Fig. 3, which are connected to nipples 34, communicating with the interior of the cores. The tubes 33 extend through the slots 32 and travel with the molds during the vulcanization. The upper ends of the tubes are detachably connected through valves 35 with a supply hose 36. The hose 36 is in the form of an endless belt supported by pulleys 37 mounted above the vulcanizing tanks and upon which the supply hose travels. A feed tube 38 is connected with the hose 36 and is provided with a swivel connection above the tank to any suitable source of pressure. One of the tubes 33 is connected with the core bag of each mold when it is introduced into the vulcanizing tank and the valve 35 is opened to admit pressure to the bag. When the mold has traveled the full length of the tank and is ready to be removed from the bath the tube 33 is disconnected at the valve 35 to permit removal of the mold. It will, of course, be obvious that an internal fluid pressure may be applied directly to the walls of the rubber article in the molds during vulcanization as well as to the interior of a bag or fluid container.

The heat for vulcanizing the articles in the mold is supplied by means of a liquid 40 contained within the vulcanizing tanks. This liquid must have a sufficiently high boiling point so that it may be maintained at a vulcanizing temperature without material evaporation. It must, of course, also have a melting point below the vulcanizing temperature so that it will be in a liquid state when maintained at such temperature. There are a number of liquids which have this property, but it has been found that paraffin is a very suitable material for this purpose. Other liquids may be employed, however, to meet the requirements of different vulcanizable compounds or articles.

The apparatus shown in the drawings is designed for the use of a liquid having a lower specific gravity than water so that it will maintain a distinct line of separation while it is superimposed upon this liquid. This property facilitates removal of the molds from the liquid without permitting any of the heating liquid to remain adhering to the molds. It has been found that when the molds are dropped into the cooling liquid a boiling of the water immediately adjacent the mold will take place, which will remove all of the paraffin from the mold which will rise to the surface of the water and thus be returned in the present construction to the original body of heating liquid. To accomplish this result, a partition wall 41 is provided at the discharge end of the tank and below the lower edge of the partition wall is a chamber 42, which communicates with the vulcanizing tank through an opening 43 at one side of the partition wall and with a discharge chamber 44 at the opposite side of the partition wall. The spaces 42 and 44 are filled with water which is permitted to rise in the opening 43 to a level somewhat above the lower edge of the wall 41. An endless conveyor 45 is arranged within the discharge chamber 44 and is driven by a chain 46 which passes over a pulley 47 on the shaft 26. The conveyor 45 is provided with flights 48 and abutments 49. As the tire molds are discharged from the end of the screw conveyor 16 they will fall by gravity through the opening 43 into the space 42. The partition wall 41 is slightly inclined so that when the mold 22 strikes the bottom of the chamber 42 its upper end will fall against the conveyor 45, and as soon as a flight 46 is brought into proper position it will engage the inner periphery of the mold and carry it upwardly through the discharge chamber 44. The abutments 49 will move into place beneath the molds so that when a mold reaches the top of the conveyor the abutment will carry it upwardly into substantially the position shown in broken lines in Fig. 2, so that it will fall upon the platform 29. The mold will be sufficiently cooled by the water in the tank 44 so that when the mold is opened it will readily separate from the vulcanized tire. When the finished tire has been removed the mold will be moved around the platform 28 and a new unvulcanized tire inserted. The mold will then be fed to the vulcanizing bath at the opposite side of the apparatus, which is a substantial duplicate of the one just described except that it is arranged in reverse position.

The liquid in the vulcanizing tank may be heated by any suitable heating mechanism and in the embodiment illustrated in the drawings electric heating units 50 are shown for this purpose. Steam pipes, gas heaters or other suitable devices may, of course, be substituted for the form of heater shown. Suitable agitators shown at 51 may be employed to stir the liquid and maintain a uniform temperature throughout the vulcanizing chamber. These agitators may be driven by any suitable power connection. It will be seen that the device is economical in the use of heat units since the only heat lost is that due to radiation and that remaining in the mold when it is transferred from the vulcanizing liquid to the cooling bath. Since the heating liquid may be maintained at the proper temperature at atmospheric pressure it is unnecessary to reinforce the vulcanizing chamber against internal pressures as is the case where steam is used for supplying the heat.

While the embodiment of the device illustrated in the drawings is especially adapted for vulcanizing tires it may, of course, be used for a large variety of objects which will readily suggest themselves to those skilled in the art.

I claim:

1. A vulcanizing process comprising the steps of subjecting a vulcanizable object to a liquid heated to a vulcanizing temperature and moving the object through said liquid during the vulcanization thereof.

2. The process of vulcanizing an article of rubber or similar material comprising the steps of enclosing said article in a mold and moving the mold and article through a liquid raised to a vulcanizing temperature.

3. The process of vulcanizing an article of rubber or similar material comprising the steps of moving the article to be vulcanized through a liquid heated to a vulcanizing temperature and contained in a vessel open to atmospheric pressure.

4. The process of vulcanizing an article of rubber or similar material comprising the steps of enclosing the article in a mold and moving said mold and article through a liquid heated to a vulcanizing temperature and contained in a vessel open to atmospheric pressure.

5. The process of vulcanizing an article comprising the steps of enclosing the article in a mold and subjecting the mold and article to a liquid heating medium contained in a vessel open to atmospheric pressure, moving the mold and article through said vessel during vulcanization thereof and subsequently cooling said mold and removing the vulcanized article therefrom.

6. The vulcanizing process comprising the steps of inserting an article within a mold and moving the mold through a vessel containing paraffin raised to a vulcanzing temperature, and withdrawing the mold through a cooling liquid not miscible with the paraffin.

7. The vulcanizing process comprising the steps of enclosing an article formed of raw material within a mold, moving the mold through a liquid heated to a vulcanizing temperature, and subsequently subjecting the mold to a cooling liquid having a lower boiling point than the liquid used for vulcanization.

8. The vulcanizing process comprising the steps of subjecting an article formed of raw material and enclosed in a mold to the heating effect of a liquid raised to a vulcanizing temperature and having a portion thereof floating upon a liquid of higher specific gravity and lowering the mold from the heating liquid to the liquid of greater specific gravity.

9. The vulcanizing process comprising the insertion of an article formed of raw material within a mold, subjecting the mold and article to a liquid heated to vulcanizing temperature, and transferring the mold to a cooling liquid to prevent the vulcanizing liquid from adhering to the mold.

10. The vulcanizing process comprising the steps of subjecting the mold having an article of raw material therein to a liquid which solidifies at ordinary temperatures but which melts at a temperature below that employed for vulcanization, permitting the mold to remain in such liquid at a vulcanizing temperature for a sufficient period of time to produce vulcanization, and transferring the mold from said vulcanizing liquid to a cooling liquid having a boiling point below the vulcanizing temperature employed so that when said mold enters said liquid the boiling of the liquid will be produced to clear the mold of the material used for heating the same during vulcanization.

11. The vulcanizing process comprising the steps of subjecting the mold having an article therein to be vulcanized to the heating action of a liquid raised to vulcanizing temperature, the liquid employed for heating having a melting point below the temperature of vulcanization but higher than usual atmospheric temperatures and having a boiling point above vulcanizing temperature, the liquid being floated upon a cooling liquid of greater specific gravity and possessing a boiling point below the temperature of vulcanization, the mold being lowered into said cooling liquid at the completion of the vulcanizing process.

12. The process of vulcanizing rubber or similar material comprising the steps of enclosing the raw material in a mold, moving the mold through a vessel containing paraffin heated to a vulcanizing temperature and transferring the mold from the paraffin vat to cool the mold and free it from adhering paraffin.

13. The vulcanizing process comprising the steps of continuously moving a series of molds through a heating liquid raised to vulcanizing temperature and contained in a vessel open to atmospheric pressure, the molds with the raw material therein being inserted at one point in said vessel and removed therefrom at a different point after they have remained in the liquid for a period of time sufficient to produce vulcanization.

14. The process of continuous vulcanization comprising the steps of conveying a series of molds through a vessel containing a liquid having a boiling point greater than the vulcanizing temperature employed.

15. The process of continuous vulcanization comprising the steps of conveying molds having articles therein to be vulcanized in succession through a vessel, the molds having the articles therein being inserted in said vessel at one point and moved through a heated liquid contained in the vessel and subsequently subjected to a cooling liquid and removed therefrom.

16. The process of continuous vulcanization comprising the steps of conveying a series of molds having articles therein to be vulcanized through a vessel containing paraffin heated to a vulcanizing temperature, the molds being inserted in said paraffin at one point in said vessel, moved through said paraffin during vulcanization and transferred from said paraffin to water to cool the mold and remove the paraffin from the surface thereof.

17. A continuous process of vulcanization which consists in, conveying a series of molds containing articles to be vulcanized through a heated liquid, removing the molds from the heated liquid and replacing the vulcanized articles by other unvulcanized articles, and conveying the molds through the heated liquid and returning them to their starting position.

18. A continuous process of vulcanization which consists in, moving a series of molds through a liquid at a vulcanizing temperature, passing the molds from the heated liquid to a cooler liquid, and emptying and refilling the molds in preparation for another vulcanizing treatment.

19. Vulcanizing apparatus comprising a container having a heating liquid therein, and means for moving articles through the liquid in said container.

20. Vulcanizing apparatus comprising a container for a heating medium, means for heating the medium in said container, and means for continuously moving articles to be vulcanized through said container.

21. Vulcanizing apparatus comprising a container having a liquid therein whose boiling point is higher than vulcanizing temperatures to be employed, means for heating the liquid in said container, means for continuously moving articles to be vulcanized through said container, means for supplying articles to said moving means during the operation thereof, and means for removing articles from said moving means during the operation thereof and after they have passed through said container.

22. Vulcanizing apparatus comprising a container open to atmospheric pressure, a conveyor for moving articles through said container, means for feeding articles to said conveyor at one end thereof, and means for subjecting articles discharged from said conveyor to a cooling medium.

23. Vulcanizing apparatus comprising a heat insulated chamber having a heating medium therein the boiling temperature of which is higher than vulcanizing temperatures to be employed, means for heating said medium within said chamber, means for agitating said medium, a conveyor for moving a succession of articles through the heating medium in said chamber, said chamber having a compartment at one end thereof for containing a cooling medium into which the articles are discharged from said conveyor.

24. Vulcanizing apparatus comprising a chamber having an upright partition wall therein with a passage beneath said wall, a heating medium within said chamber at one side of said wall, and a cooling medium within said chamber on the opposite side of said wall.

25. Vulcanizing apparatus comprising a chamber having a partition wall therein with a passage beneath said wall, a heating medium within said chamber at one side of said wall, a cooling medium of a different specific gravity at the opposite side of said wall, a conveyor for transferring articles through said heating medium from which conveyor said articles are discharged adjacent said wall and moved beneath said wall into the portion of said chamber containing said cooling medium.

26. Vulcanizing apparatus comprising a tank having a partition wall adjacent one end thereof and having a passage beneath said wall, a conveyor for transferring articles to said tank at one side of said wall and discharging said articles in position to pass beneath said wall, a second conveyor for receiving the discharged articles and for raising them through the portion of said tank at the opposite side of said wall from that on which they were discharged from said first conveyor, said second conveyor being arranged to discharge said articles from said tank.

27. Vulcanizing apparatus comprising a tank having a partition wall adjacent one end thereof, a conveyor for separating liquids of different specific gravity contained in said tank, said wall having a passage therebeneath, a conveyor for transferring articles through the portion of said tank at one side of said wall and for discharging said articles in position to pass beneath said wall, means for heating the liquid surrounding said articles carried by said conveyor to a vulcanizing temperature, and a second conveyor at the opposite side of said wall for receiving articles discharged from said first-mentioned conveyor and for removing the articles from said tank.

28. Vulcanizing apparatus comprising a pair of tanks arranged side by side, means for continuously moving vulcanizing molds through said tanks, and means at opposite portions of said tanks for facilitating the removal of finished articles from said molds and the insertion of articles of raw material into said molds and for transferring said molds from one of said tanks to the other.

29. Vulcanizing apparatus comprising a vulcanizing chamber, means for moving articles through said chamber, and means for supplying fluid pressure to said articles during said movement.

30. Vulcanizing apparatus comprising a tank for containing a heating medium, means for moving molds through the medium in said tank, and detachable means for supplying fluid pressure to said molds during the movement thereof in said tank.

31. Vulcanizing apparatus comprising a tank for containing a heating medium, a conveyor for transferring a mold through said tank to produce vulcanization of material therein, a movable conduit positioned above said tank, and detachable tubes connecting said conduit with the interior of said molds to supply fluid pressure to said molds during vulcanization.

32. A vulcanizing process including the steps of subjecting an article to a liquid heated to vulcanizing temperature and lowering the article from said liquid into a cooling medium to free the article from any of said heated liquid that might otherwise adhere thereto.

33. A vulcanizing process in which an article is subjected to a liquid heated to vulcanizing temperature and floated on a cooling medium of higher specific gravity and removing the article from said heated liquid by lowering it into the cooling medium, thus freeing any of the heated liquid adhering to the article and permitting it to return to the body of floated liquid.

34. A vulcanizing system comprising a pair of spaced apart loading and unloading stations, means intermediate said stations for holding liquid, and means between said stations for conveying molds from one to the other immersed in the liquid.

35. A vulcanizing system comprising a pair of spaced apart loading and unloading stations, means intermediate said stations for holding liquid, means between said stations for conveying molds from one to the other immersed in the liquid, and means for maintaining a fluid pressure on the interior of articles within said molds during immersion of the molds.

36. That process of vulcanizing articles in molds which consists in, subjecting a mold containing the article to a liquid at a vulcanizing temperature suited to the article, and removing the mold from the heated liquid through a cooler liquid in contact or communication therewith.

37. That method of vulcanizing hollow rubber articles which consists in, conveying the molds through a liquid to effect vulcanization of the article, and maintaining a wall-compacting pressure on the interior of the articles during conveyance of the molds.

38. That method of vulcanizing hollow rubber articles which consists in, inserting a fluid container within the article, introducing the assemblage in a mold, conducting the mold through a heated liquid and vulcanizing the article, and supplying fluid under pressure to the container during the travel of the mold through a heated liquid.

In testimony whereof I have signed my name to this specification on this 23d day of May, A. D. 1922.

LEE R. McGUIRE.